(12) United States Patent
Savagian et al.

(10) Patent No.: US 7,135,979 B2
(45) Date of Patent: Nov. 14, 2006

(54) IN-MOLD RADIO FREQUENCY IDENTIFICATION DEVICE LABEL

(75) Inventors: Michael D. Savagian, Germantown, WI (US); Steven H. Mess, Franklin, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 637 days.

(21) Appl. No.: 10/294,069

(22) Filed: Nov. 14, 2002

(65) Prior Publication Data

US 2004/0094949 A1 May 20, 2004

(51) Int. Cl.
*G08B 13/14* (2006.01)

(52) U.S. Cl. ............ 340/572.8; 340/572.1; 235/488; 428/354

(58) Field of Classification Search ....... 340/572.1, 340/572.8; 235/488; 428/354
See application file for complete search history.

(56) References Cited

U.S. PATENT DOCUMENTS

| | | | |
|---|---|---|---|
| 4,861,644 A | 8/1989 | Young et al. | |
| 5,193,711 A | 3/1993 | Hirata et al. | |
| 5,497,140 A | 3/1996 | Tuttle | |
| 5,528,222 A | 6/1996 | Moskowitz et al. | |
| 5,863,076 A | 1/1999 | Warther | |
| 5,868,986 A | 2/1999 | Foulkes | |
| 5,879,502 A | 3/1999 | Gustafson | |
| 5,920,290 A * | 7/1999 | McDonough et al. | 343/873 |
| 5,982,284 A | 11/1999 | Baldwin et al. | |
| 6,004,682 A | 12/1999 | Rackovan et al. | |
| 6,027,027 A | 2/2000 | Smithgall | |
| 6,030,490 A * | 2/2000 | Francisco et al. | 156/380.8 |
| 6,053,414 A | 4/2000 | Stoll et al. | |
| 6,163,260 A | 12/2000 | Conwell et al. | |
| 6,206,282 B1 | 3/2001 | Hayes, Sr. et al. | |
| 6,206,292 B1 * | 3/2001 | Robertz et al. | 235/488 |
| 6,262,692 B1 | 7/2001 | Babb | |
| 6,281,795 B1 | 8/2001 | Smith et al. | |
| 6,294,998 B1 | 9/2001 | Adams et al. | |
| 6,302,461 B1 | 10/2001 | Debras et al. | |
| 6,357,664 B1 | 3/2002 | Zercher | |
| 6,422,605 B1 | 7/2002 | Lind | |
| 6,486,783 B1 * | 11/2002 | Hausladen et al. | 340/572.8 |
| 6,562,454 B1 * | 5/2003 | Takahashi et al. | 428/354 |
| 2002/0140558 A1 * | 10/2002 | Lian et al. | 340/572.8 |
| 2003/0136503 A1 * | 7/2003 | Green et al. | 156/264 |
| 2004/0262404 A1 * | 12/2004 | Fujiki et al. | 235/488 |

* cited by examiner

*Primary Examiner*—Jeffery Hofsass
*Assistant Examiner*—Samuel J. Walk
(74) *Attorney, Agent, or Firm*—Quarles & Brady LLP

(57) ABSTRACT

A label for use as an in-mold label and including a radio frequency identification device (RFID) is disclosed. The label includes an RFID having opposed first and second surfaces; a first layer of heat-activated adhesive disposed on the first surface of the RFID; a second layer of heat-activated adhesive disposed on the second surface of the RFID; and a surface layer comprising a polymeric film disposed on a surface of the first layer of heat-activated adhesive opposite the first surface of the RFID. The label is placed in a mold with the surface layer contacting the mold. A polymer is molded in the mold such that the second layer of heat-activated adhesive (or a surface layer over the second layer of heat-activated adhesive) adheres to the polymer thereby producing a labeled article that can be identified using the radio frequency identification device in the label.

21 Claims, 1 Drawing Sheet

IN-MOLD RADIO FREQUENCY IDENTIFICATION DEVICE LABEL

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to labels including a radio frequency identification device, and more particularly to labels including a radio frequency identification device wherein the label is compatible with an in-mold process. This allows the label to be incorporated into plastic parts, such as bins and pallets, for durable tracking purposes.

2. Description of the Related Art

It is well known that items, such as plastic bins and pallets in a factory, can be tracked and identified using a radio frequency identification device (RFID). An RFID generally includes an antenna connected to an integrated circuit chip in which digital information is stored. The RFID transmits stored data by reflecting varying amounts of an electromagnetic field provided by an RFID interrogator. An RFID can now be manufactured in a very small, light weight and inexpensive unit.

A problem exists in finding a durable and cost-effective way of attaching an RFID to items to be tracked. One means for attaching an RFID to an item is an externally fastened tag. However, such tags are prone to being torn away from the item during transport. Self adhesive labels for an RFID have also been used in numerous applications where the performance and convenience of a pressure sensitive adhesive is suitable. See, for example, U.S. Pat. Nos. 6,281,795, 6,163,260 and 5,982,284. However, these labels may also be susceptible to being torn away from an item. To provide a smooth finish and excellent resistance to detachment in a molded article, embedding or in-molding of an RFID in a molded article has been proposed. See, for example, U.S. Pat. Nos. 6,302,461 and 6,206,282.

Many injection molded plastic products are manufactured from the family of polyolefins including polyethylene and polypropylene. These materials are used to produce rugged products, especially containers. The molding process includes heating a polyolefin resin to a melt-flow temperature (as high as 270° C.) and injecting under pressure into a temperature controlled mold. Depending upon mold size and complexity, this is done under pressure as high as hundreds of pounds per square inch. Typically, an in-mold label is placed in position on the wall of a mold, the mold is closed and the injection process begins. The wall temperature of the mold prevents the label from exceeding its own melt temperature. The in-mold label material is often made from an olefinic material treated for adhesion. Being similar in nature to the olefinic plastic used in the molding process, high adhesion is developed to the finished, molded article. The plastic used in the molding process is softened by heat and flows with molding pressure to fill the mold and capture the edges of the in-mold label. The surface of the mold itself retains the dimension of the finished product so the in-mold label is flush with the surface of the finished product.

A standard pressure sensitive RFID label is made using a pressure sensitive adhesive on one side of an RFID and a film or paper label stock laminated to the other, usually with another pressure sensitive adhesive. Typically, an RFID is somewhat fragile, especially in the area of the integrated chip. Inexpensive RFIDs for general label purposes are usually supplied with the antenna and chip attached to a flexible polyester film substrate. If a standard pressure sensitive RFID label is used in an in-mold process, the melt/flow temperature of typical pressure sensitive adhesives is exceeded and the label moves out of position and is distorted, delaminated or otherwise damaged a high percentage of the time. Even high performance acrylic pressure sensitive adhesives do not function well during the exposure to heat and pressure of an injection molding process. They soften excessively and lose their bond.

Thus, there exists a need for a label including a radio frequency identification device wherein (i) the label protects the radio frequency identification device chip during and after in-molding of the label in an article, (ii) the label includes a protective outer sheet that resists mechanical and chemical damage, (iii) the label provides for improved structural integrity during an in-molding process, and (iv) the label allows for improved bonding to an article during an in-molding process.

SUMMARY OF THE INVENTION

The foregoing needs are met by a label according to the invention. The label comprises a radio frequency identification device having opposed first and second surfaces; a first layer of heat-activated adhesive disposed on the first surface of the radio frequency identification device; a second layer of heat-activated adhesive disposed on the second surface of the radio frequency identification device; and a surface layer comprising a polymeric film disposed on a surface of the first layer of heat-activated adhesive opposite the first surface of the radio frequency identification device. The label according to the invention is particularly suited for use as an in-mold label. In a method according to the invention, the label is placed into a mold such that the surface layer contacts the mold. A moldable polymer is then introduced into the mold, and the polymer is molded in the mold such that the second layer of heat-activated adhesive contacts and adheres to the polymer thereby producing a labeled molded polymeric article that can be tracked or identified using the radio frequency identification device included in the in-molded label.

In another form, the label comprises a radio frequency identification device having opposed first and second surfaces; a first layer of heat-activated adhesive disposed on the first surface of the radio frequency identification device; a second layer of heat-activated adhesive disposed on the second surface of the radio frequency identification device; a first surface layer comprising a first polymeric film disposed on a surface of the first layer of heat-activated adhesive opposite the first surface of the radio frequency identification device; and a second surface layer comprising a second polymeric film disposed on a surface of the second layer of heat-activated adhesive opposite the second surface of the radio frequency identification device. This label according to the invention is also particularly suited for use as an in-mold label. In another method according to the invention, this label is placed into a mold such that the first surface layer contacts the mold. A moldable polymer is then introduced into the mold, and the polymer is molded in the mold such that the second surface layer contacts and adheres to the polymer thereby producing a labeled molded polymeric article that can be tracked or identified using the radio frequency identification device included in the in-molded label.

It has been discovered that: (1) the side of a radio frequency identification device label with the chip attached should face to the inside of a mold to prevent damage due to extensive heat and pressure during in-molding and the resultant deformation of the flexible radio frequency identification device; (2) providing a label including a radio frequency identification device with a protective outer sheet resists mechanical and chemical damage to the label when molded in an article; (3) laminating a radio frequency identification device with heat activated adhesives greatly improves the resistance to the heat of an in-mold labeling process compared to pressure sensitive adhesive lamination, and (4) using an olefinic label stock suitable for in-mold labels in a label including a radio frequency identification device offers great improvements to the adhesion of the label to a molded article.

Thus, the invention satisfies a need for a way to track reusable plastic items, such as bins and pallets, in a factory. Simple adhesion of a radio frequency identification device label to these items is a poor solution, because the label would be rendered inoperative from normal long-term wear. This invention provides a way to protect the radio frequency identification device label and greatly extend its lifespan by incorporating the label within the plastic part itself during an in-molding process.

It is therefore an advantage of the present invention to provide a label including a radio frequency identification device wherein the label protects the radio frequency identification device chip during and after in-molding of the label in an article.

It is another advantage of the present invention to provide a label including a radio frequency identification device wherein the label includes a protective outer sheet that resists mechanical and chemical damage.

It is yet another advantage of the present invention to provide a label including a radio frequency identification device wherein the label provides for improved structural integrity during an in-molding process.

It is still another advantage of the present invention to provide a label including a radio frequency identification device wherein the label allows for improved bonding to an article during an in-molding process.

These and other features, aspects, and advantages of the present invention will become better understood upon consideration of the following detailed description, drawings, and appended claims.

DETAILED DESCRIPTION OF THE INVENTION

Figure 1:
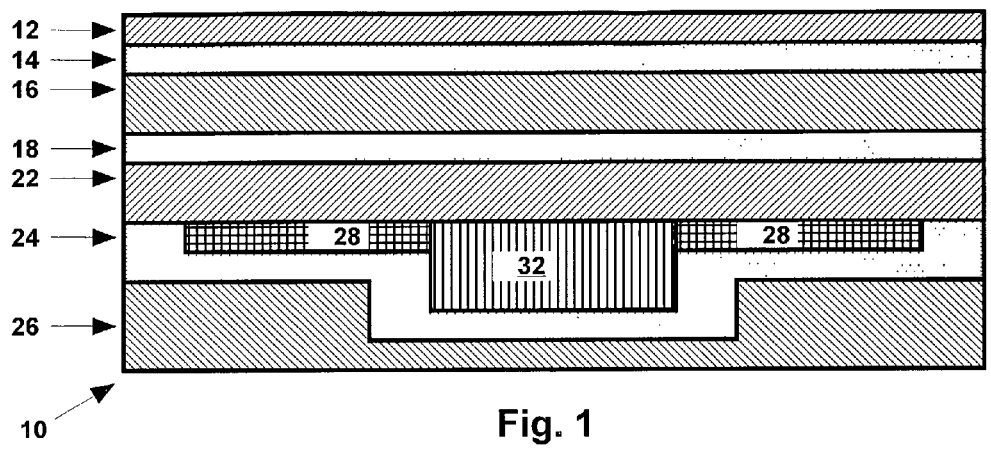
FIG. 1 shows a side cross-sectional view of a first embodiment of a label according to the invention.

Turning first to FIG. 1, there is shown a first embodiment of a label according to the invention. The label, indicated generally at 10, includes a radio frequency identification device which comprises an integrated circuit chip 32 connected to an antenna 28. The radio frequency identification device is mounted on a flexible substrate 22, which typically comprises a polyester film. The term "radio frequency identification device" as used herein and in the appended claims, is to be construed as any device capable of communicating by radio frequency. For example, the term "radio frequency identification device" should be construed as encompassing devices that transmit or receive any data by radio frequency, not just identification data. The radio frequency identification device is of any conventional construction such as described in U.S. Pat. No. 5,497,140.

A first layer 18 of heat-activated adhesive is disposed on the surface of substrate 22 of the radio frequency identification device, and a second layer 24 of heat-activated adhesive is disposed on the surface of the integrated circuit chip 32 and antenna 28 of the radio frequency identification device. A polymeric film 16 is disposed on the surface of the first layer 18 of heat-activated adhesive opposite the radio frequency identification device. On the side of the polymeric film 16 opposite the first layer 18 of heat-activated adhesive, there is disposed a third layer 14 of heat-activated adhesive. A protective polymeric film 12 is disposed on the surface of the third layer 14 of heat-activated adhesive opposite the polymeric film 16. Thus, in the embodiment of FIG. 1, a surface layer comprising the protective polymeric film 12, the third layer 14 of heat-activated adhesive, and the polymeric film 16 is disposed over the first layer 18 of heat-activated adhesive on the surface of substrate 22 of the radio frequency identification device. A polymeric film 26 comprising a second surface layer is disposed on the surface of the second layer 24 of heat-activated adhesive opposite the radio frequency identification device.

Figure 2:
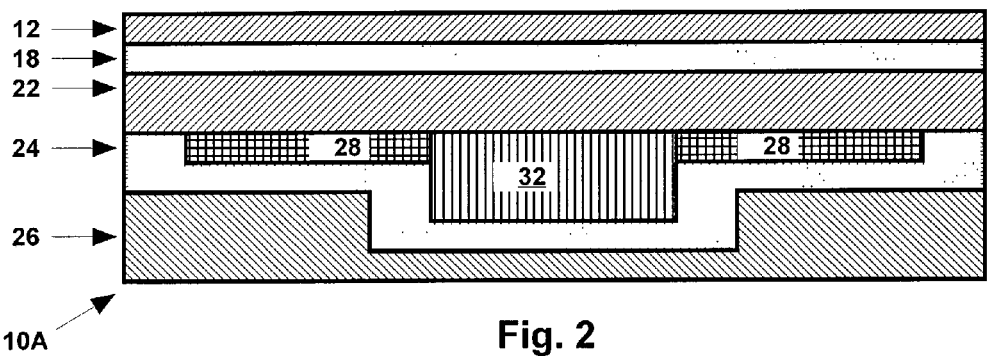
FIG. 2 shows a side cross-sectional view of a second embodiment of a label according to the invention.

Turning now to FIG. 2, there is shown a second embodiment of a label according to the invention. The label, indicated generally at 10A, includes a radio frequency identification device comprising a flexible substrate 22 and an integrated circuit chip 32 connected to an antenna 28 as in the embodiment of FIG. 1. In the second embodiment of FIG. 2, a first layer 18 of heat-activated adhesive is disposed on the surface of substrate 22 of the radio frequency identification device, and a second layer 24 of heat-activated adhesive is disposed on the surface of the integrated circuit chip 32 and antenna 28 of the radio frequency identification device. A protective polymeric film 12 is disposed on the surface of the first layer 18 of heat-activated adhesive opposite the radio frequency identification device. A polymeric film 26 comprising a second surface layer is disposed on the surface of the second layer 24 of heat-activated adhesive opposite the radio frequency identification device. It can be seen that the polymeric film 16 and the third layer 14 of heat-activated adhesive shown in FIG. 1 are not included in the second embodiment of FIG. 2. In other words, in the embodiment of FIG. 2, a surface layer comprising the protective polymeric film 12 is disposed over the first layer 18 of heat-activated adhesive on the surface of substrate 22 of the radio frequency identification device.

Figure 3:
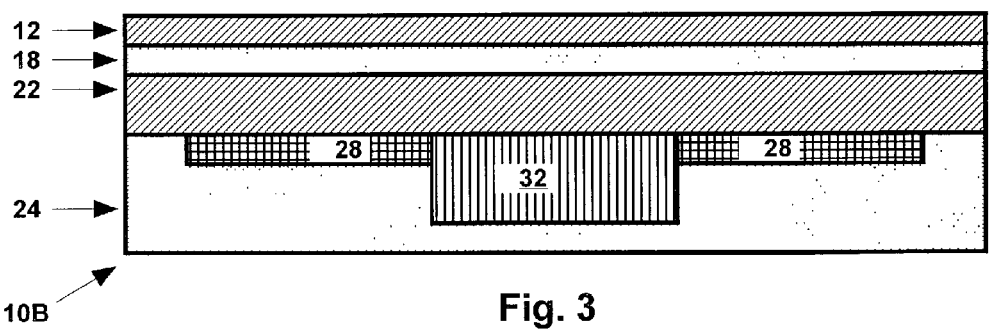
FIG. 3 shows a side cross-sectional view of a third embodiment of a label according to the invention.
Like reference numerals will be used to refer to like or similar parts from Figure to Figure in the following description.

Turning now to FIG. 3, there is shown a third embodiment of a label according to the invention. The label, indicated generally at 10B, includes a radio frequency identification device comprising a flexible substrate 22 and an integrated circuit chip 32 connected to an antenna 28 as in the embodiment of FIGS. 1 and 2. In the third embodiment of FIG. 3, a first layer 18 of heat-activated adhesive is disposed on the surface of substrate 22 of the radio frequency identification device, and a second layer 24 of heat-activated adhesive is disposed on the surface of the integrated circuit chip 32 and antenna 28 of the radio frequency identification device. A protective polymeric film 12 is disposed on the surface of the first layer 18 of heat-activated adhesive opposite the radio frequency identification device. It can be seen that the polymeric film 16, the polymeric film 26 and the third layer 14 of heat-activated adhesive shown in FIG. 1 are not included in the third embodiment of FIG. 3. Thus, in the embodiment of FIG. 3, a surface layer comprising the protective polymeric film 12 is disposed over the first layer 18 of heat-activated adhesive on the surface of substrate 22 of the radio frequency identification device. However, a surface layer comprising the protective polymeric film 12, the third layer 14 of heat-activated adhesive, and the polymeric film 16 as shown in FIG. 1 could alternatively be disposed over the first layer 18 of heat-activated adhesive on the surface of substrate 22 of the radio frequency identification device.

Having detailed the layered construction of three embodiments of the invention, non-limiting examples of materials that can be used in the first layer 18 of heat-activated adhesive, the second layer 24 of heat-activated adhesive, and the third layer 14 of heat-activated adhesive can now be described. The heat-activated adhesive used in the first layer 18, the second layer 24, and the third layer 14 (all of which may or may not be present in the labels 10, 10A and 10B of the present invention as detailed above) may comprise any heat-activated adhesive that does not significanitly effect the performance of the radio frequency identification device and that provides structural integrity during the application of heat and pressure in an in-molding process.

Non-limiting examples of suitable heat-activated adhesives include polyester resins, polyethylene, copolymers of ethylene and an ethylenically unsaturated carboxylic acid or ester. The ethylenically unsaturated carboxylic acid or ester may be, for example, acrylic acid, methacrylic acid, methylmethacrylate, butyl acrylate, and vinyl acetate. One specific example of a heat-activated adhesive is a polyester resin sold under the trademark "Mor-Ester" by Rohm and Haas. The heat-activated adhesive may be applied to the radio frequency identification device and polymeric films 12, 16 and 26 in a coating solution. Any suitable solvent or solvent mixtures may be employed to form a coating solution. Typical solvents include tetrahydrofuran, toluene, methylene chloride, cyclohexanone, and the like, and mixtures thereof. Conventional techniques for applying the coating mixture to the radio frequency identification device and polymeric films 12, 16 and 26 include spraying, dip coating and roll coating.

The heat-activated adhesive in the first layer 18, the second layer 24, and the third layer 14 may be the same or different, and may comprise a single heat-activated adhesive or a mixture of heat-activated adhesives. Satisfactory results may be achieved with a first layer 18 thickness between about 0.0001 inches and about 0.002 inches, a second layer 24 thickness between about 0.0001 inches and about 0.002 inches, and a third layer 14 thickness between about 0.0001 inches and about 0.002 inches. In an example embodiment, the first layer 18, the second layer 24 and the third layer 14 of heat-activated adhesive have a thickness of about 0.0002 inches.

Non-limiting examples of materials that can be used in the protective polymeric film 12 can also now be described. The protective polymeric film 12 can be designed of a selection of materials of adequate strength and toughness (such as 0.0005", 0.003", 0.005", or 0.007" thick polyester or polyethylene terephthalate film sold as Mylar® by DuPont) to help the radio frequency identification device resist mechanical damage. The protective polymeric film 12 can also be designed of a material with excellent outdoor durability (such as polyvinyl fluoride film sold as Tedlar® by DuPont) to allow the finished article to be used for a long period of time outdoors. The protective polymeric film 12 can also be designed of an inexpensive printable film such as the porous silica filled polyolefin (typically polyethylene) film sold as Teslin® by PPG Industries to give it excellent printability. The protective polymeric film 12 can also be made from numerous other film materials for specific properties desired, such as the polyimide film sold as Kapton® by DuPont and the polyethylene naphthalate film sold as Kaladex® by DuPont.

The polymeric film used in the protective polymeric film 12 may be the same or different, and may comprise a single polymeric film or a coextruded or coated polymeric film. Satisfactory results may be achieved with a protective polymeric film 12 thickness between about 0.0005 inches and about 0.020 inches. In an example embodiment, the protective polymeric film 12 is a polyester or polyethylene terephthalate film having a thickness of about 0.0005 inches.

Non-limiting examples of materials that can be used in the polymeric film 16 and the polymeric film 26 can also now be described. The polymeric film 16 and the polymeric film 26 may comprise a polyester or polyethylene terephthalate film, a polyvinyl fluoride film, a polyolefin (typically polyethylene) film, a polyimide film or a polyethylene naphthalate film. The polymeric films used in the polymeric film 16 and the polymeric film 26 may be the same or different, and may comprise a single polymeric film or a coextruded or coated polymeric film. The film must have sufficient heat-sealable properties. Satisfactory results may be achieved with a polymeric film 16 thickness between about 0.002 inches and about 0.020 inches, and a polymeric film 26 thickness between about 0.002 inches and about 0.020 inches. In an example embodiment, the polymeric film 16 and the polymeric film 26 each comprise a porous silica filled polyolefin, typically polyethylene, film (sold as Teslin® by PPG Industries) having a thickness of about 0.0070 inches. Using a porous silica filled polyolefin, typically polyethylene, offers great improvements to the adhesion of an in-molded label to a molded article.

The labels 10, 10A and 10B described above can be supplied in either continuous rolls, scored or perforated rolls, or individual cut tags, and are particularly suited for use as an in-mold label in an in-molding process that produces a polymeric article that is desired to be tracked or identified in subsequent use. The labels 10, 10A and 10B are suitable for conventional inmolding processes such as those described in U.S. Pat. Nos. 6,422,605, 6,044,682, 5,868,986 and 5,193,711 which are incorporated herein by reference.

Typically, at the site of polymeric article manufacture, stacks of individual labels 10 or 10A or 10B are loaded in a dispensing magazine and a label is picked-off the magazine and applied to the interior surface of a mold with the protective polymeric layer 12 of the label 10 or 10A or 10B oriented in facing (and typically contacting) relationship with the inner surface of the mold wall. This orientation of the labels 10 or 10A or 10B with the protective polymeric film 12 towards the mold wall assures that the radio frequency identification device remains flat through the molding process and prevents the high mold pressure from distorting the antenna around the integrated circuit chip and damaging its functionality. The cool, temperature controlled mold wall also helps protect the radio frequency identification device from exceeding its reliable temperature range during the molding cycle.

The label may be held accurately in position within the mold by a vacuum applied through holes in the mold wall.

There may or may not be a recess on the interior mold surface to accommodate the label. A hot fluid thermoplastic resin (or hot resins that react to form a thermoset material) is fed into the mold, and as the hot resin contacts the polymeric film 26 of the label 10 or 10A, or the second layer 24 of heat-activated adhesive of the label 10B, heat transferred from the hot resin activates the heat-activated adhesive layers. When the molded polymeric article is sufficiently cooled, it is ejected from the mold. The radio frequency identification device functionality is thereby included in the molded article and the protective film is exposed at the surface of the article, optionally bearing graphics.

There is sometimes warping distortion that can occur as the heated molten plastic cools in the mold adhered to the in-mold label construction. This is known in the art and can be offset by compensation in the mold dimension or label materials. For example, the films can be selected such that the annealing temperature of the in-mold label film exceeds the service temperature in the mold in order to avoid label shrinkage or distortion. To assure a uniform joining of the label and container, it is also desirable that the softening temperature of the in-mold label film be close to the service temperature. If, as is preferred, the label is on, not in, the interior surface of the mold, the label becomes embedded in the article to which it is adhered, thus advantageously providing an inset label that is flush with the container surface without diminishing the structural integrity of the article to any detected degree.

EXAMPLES

The following examples serve to further illustrate the invention. The examples are not intended to limit the invention in any way.

Example 1

A label 10 as shown in FIG. 1 was prepared as follows. The label 10 was made by: (1) solvent coating, at about 2 to 6#/ream, two 0.0070" thick polyolefin films (Teslin® brand porous silica filled polyethylene available from PPG Industries) with a thermoplastic heat activated adhesive polyester resin (MorEster® 49000 brand polyester resin available from Rohm and Haas); (2) heat laminating a flexible radio frequency identification device to the polyolefin layers at 275° F. at a speed that is slow enough to soften the polyolefin so it can form around the irregular profile of the integrated circuit chip and antenna of the radio frequency identification device; and (3) heat laminating a 0.001" polyester film with a polyethylene heat laminating adhesive to the flat side (non-chip side) of the polyolefin-radio frequency identification device laminate. The end product can be supplied in either continuous rolls, scored or perforated rolls, or individual cut tags.

Fifty labels were prepared using the methods of Example 1. These fifty labels were in-molded in a polypropylene crate using conventional methods. Fifty out of fifty samples tested by in-molding into a polypropylene crate were fully functional. Thus, the label of Example 1 provides a construction that withstands molding temperatures and pressures and results in a label with high adhesion to a molded article, undamaged by the molding process. Due to the fact that the radio frequency identification device label is insert molded, it is encased in the plastic molding compound. This provides the extra protection required to use a flexible radio frequency identification device.

Example 2

A label 10A as shown in FIG. 2 was prepared as follows. The label 10A was made by: (1) solvent coating, at about 2 to 6#/ream, a 0.002" thick white pigmented polyester film (e.g., Mylar® brand pigmented polyester film available from DuPont) and a 0.0070" thick polyolefin film (Teslin® brand porous silica filled polyethylene available from PPG Industries) with a thermoplastic heat activated adhesive polyester resin (Mor-Ester® 49000 brand polyester resin available from Rohm and Haas); (2) heat laminating the chip side of a radio frequency identification device to the polyolefin layer at 275° F. at a speed that is slow enough to soften the polyolefin so it can form around the irregular profile of the integrated circuit chip and antenna of the radio frequency identification device; and (3) heat laminating the polyester film to the flat side (non-chip side) of the polyolefin-radio frequency identification device laminate. The end product can be supplied in either continuous rolls, scored or perforated rolls, or individual cut tags.

Therefore, it can been seen that a radio frequency identification device label according to the invention will withstand plastic molding temperatures and pressures and result in a label with high adhesion to the molded article. It has been discovered that: (1) laminating a radio frequency identification device with heat activated adhesives greatly improves the resistance to the heat of an in-mold labeling process compared to pressure sensitive adhesive lamination, (2) using an olefinic label stock suitable for in-mold labels in a label including a radio frequency identification device offers great improvements to the adhesion of the label to a molded article, and (3) the side of a radio frequency identification device with the chip attached should face to the inside of a mold to prevent damage due to extensive heat and pressure during in-molding and the resultant deformation of the flexible radio frequency identification device. The invention is advantageous in that inexpensive, flexible radio frequency identification devices can be incorporated in injection molded articles, especially where resistance to heat and pressure are critical. Maximizing resistance to heat and pressure allows the use of the thinnest and consequently least expensive materials in designs where available molded wall thickness is minimal.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

INDUSTRIAL APPLICABILITY

This invention relates to labels including a radio frequency identification device, and more particularly to labels including a radio frequency identification device wherein the label is compatible with an in-molding process. This allows the label to be incorporated in plastic parts for durable tracking and identification purposes.

What is claimed is:
1. A label comprising:
a radio frequency identification device having opposed first and second surfaces;
a first layer of heat-activated adhesive disposed on the first surface of the radio frequency identification device;

a second layer of heat-activated adhesive disposed on the second surface of the radio frequency identification device; and
a surface layer disposed on a surface of the first layer of heat-activated adhesive opposite the first surface of the radio frequency identification device, the surface layer comprising a polymeric film,
wherein the surface layer comprises a heat-activated adhesive disposed between a second polymeric film and the polymeric film, the second polymeric film contacting the first layer of heat-activated adhesive.

2. The label of claim 1 wherein:
the radio frequency identification device comprises an integrated circuit chip mounted on one side of a flexible substrate, and
the chip is arranged adjacent the second layer of heat-activated adhesive.

3. A method for securing a radio frequency identification device to an article to be tracked or identified, the method comprising:
placing into a mold a label according to claim 2 such that the surface layer contacts the mold;
introducing a moldable polymer into the mold;
molding the polymer in the mold such that the second layer of heat-activated adhesive contacts and adheres to the polymer thereby producing a labeled molded polymeric article.

4. The label of claim 1 wherein:
the surface layer comprises a film formed from a polymeric material selected from the group consisting of polyesters, polyethylene terephthalate, polyvinyl fluoride, polyolefins, polyimides, and polyethylene naphthalate.

5. The label of claim 1 wherein:
the surface layer comprises a polyester film.

6. The label of claim 1 wherein:
the heat-activated adhesive of the first layer and the heat activated adhesive of the second layer each comprise a thermoplastic polyester resin.

7. The label of claim 1 wherein:
the first polymeric film is a polyester film, and
the second polymeric film is a porous polyolefin film.

8. A method for securing a radio frequency identification device to an article to be tracked or identified, the method comprising:
placing into a mold a label according to claim 1 such that the surface layer contacts the mold;
introducing a moldable polymer into the mold;
molding the polymer in the mold such that the second layer of heat-activated adhesive contacts and adheres to the polymer thereby producing a labeled molded polymeric article.

9. A label comprising:
a radio frequency identification device having opposed first and second surfaces;
a first layer of heat-activated adhesive disposed on the first surface of the radio frequency identification device;
a second layer of heat-activated adhesive disposed on the second surface of the radio frequency identification device;
a first surface layer disposed on a surface of the first layer of heat-activated adhesive opposite the first surface of the radio frequency identification device, the first surface layer comprising a first polymeric film; and
a second surface layer disposed on a surface of the second layer of heat-activated adhesive opposite the second surface of the radio frequency identification device, the second surface layer comprising a second polymeric film.

10. The label of claim 9 wherein:
the radio frequency identification device comprises an integrated circuit chip mounted on one side of a flexible substrate, and
the chip is arranged adjacent the second layer of heat-activated adhesive.

11. A method for securing a radio frequency identification device to an article to be tracked or identified, the method comprising:
placing into a mold a label according to claim 10 such that the first surface layer contacts the mold;
introducing a moldable polymer into the mold;
molding the polymer in the mold such that the second surface layer contacts and adheres to the polymer thereby producing a labeled molded polymeric article.

12. The label of claim 9 wherein:
the first surface layer comprises a film formed from a polymeric material selected from the group consisting of polyesters, polyethylene terephthalate, polyvinyl fluoride, polyolefins, polyimides, and polyethylene naphthalate.

13. The label of claim 9 wherein:
the first surface layer comprises a polyester film.

14. The label of claim 9 wherein:
the heat-activated adhesive of the first layer and the heat activated adhesive of the second layer each comprise a thermoplastic polyester resin.

15. The label of claim 9 wherein:
the first surface layer comprises a heat-activated adhesive disposed between a third polymeric film and the first polymeric film, the third polymeric film contacting the first layer of heat-activated adhesive.

16. The label of claim 15 wherein:
the first polymeric film is a polyester film,
the second polymeric film is a porous polyolefin film, and
the third polymeric film is a porous polyolefin film.

17. The label of claim 16 wherein:
the heat-activated adhesive of the first layer and the heat activated adhesive of the second layer each comprise a thermoplastic polyester resin.

18. The label of claim 9 wherein:
the first surface layer is a polyester film, and
the second surface layer is a porous polyolefin film.

19. The label of claim 9 wherein:
the first surface layer is a polyethylene terephthalate film.

20. The label of claim 19 wherein:
the second surface layer is a porous silica filled polyethylene film.

21. A method for securing a radio frequency identification device to an article to be tracked or identified, the method comprising:
placing into a mold a label according to claim 9 such that the first surface layer contacts the mold;
introducing a moldable polymer into the mold;
molding the polymer in the mold such that the second surface layer contacts and adheres to the polymer thereby producing a labeled molded polymeric article.

* * * * *